United States Patent
Soriente et al.

(10) Patent No.: US 11,361,069 B2
(45) Date of Patent: Jun. 14, 2022

(54) SUBVERSION RESILIENT ATTESTATION FOR TRUSTED EXECUTION ENVIRONMENTS

(71) Applicant: NEC Laboratories Europe GmbH, Heidelberg (DE)

(72) Inventors: Claudio Soriente, Madrid (ES); Antonio Faonio, Madrid (ES); Dario Fiore, Madrid (ES); Luca Nizzardo, Madrid (ES)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 16/538,966

(22) Filed: Aug. 13, 2019

(65) Prior Publication Data

US 2020/0097648 A1 Mar. 26, 2020

Related U.S. Application Data

(60) Provisional application No. 62/733,660, filed on Sep. 20, 2018.

(51) Int. Cl.
| | |
|---|---|
| *G06F 21/53* | (2013.01) |
| *G06F 21/60* | (2013.01) |
| *H04L 9/08* | (2006.01) |
| *H04L 9/32* | (2006.01) |

(52) U.S. Cl.
CPC ............ *G06F 21/53* (2013.01); *G06F 21/602* (2013.01); *H04L 9/0891* (2013.01); *H04L 9/3213* (2013.01); *H04L 9/3218* (2013.01)

(58) Field of Classification Search
None
See application file for complete search history.

(56) References Cited

U.S. PATENT DOCUMENTS

2009/0210716 A1* 8/2009 Chen ................... H04L 9/3073 713/176
2017/0222878 A1* 8/2017 Jacquin ............... H04L 41/0893

FOREIGN PATENT DOCUMENTS

WO WO 2017/049111 A1 3/2017

OTHER PUBLICATIONS

Olenski, Julie "How do Digital Signatures Work? A Look Behind the Scenes" [online] GlobalSign. May 18, 2015 [retrieved Mar. 24, 2021]. Retrieved from the Internet: URL: https://www.globalsign.com/en-sg/blog/how-do-digital-signatures-work (Year: 2015).*

Ascertia "Basics of Digital Signatures and PKI" [online] Ascertia, 2017. [retrieved Jul. 20, 2021]. Retrieved from the Internet: URL: https://www.signinghub.com/wp-content/uploads/2017/05/Basics-of-Digital-Signatures-and-PKI-s.pdf (Year: 2017).*

(Continued)

*Primary Examiner* — Taghi T Arani
*Assistant Examiner* — Joshua Raymond White
(74) *Attorney, Agent, or Firm* — Leydig, Voit & Mayer, Ltd.

(57) ABSTRACT

A computer-implemented method includes receiving an original message from a trusted execution environment. The original message includes an original digital signature authored by the trusted execution environment. The method includes computing a proof of knowledge for the original digital signature and modifying the original message by replacing the original digital signature with the proof of knowledge.

14 Claims, 3 Drawing Sheets

(56) References Cited

OTHER PUBLICATIONS

Camenisch, Jan et al. "Anonymous Attestation with Subverted TPMs" [online] IBM Research. Aug. 2, 2017 [retrieved Mar. 24, 2021]. Retrieved from the Internet: URL: https://eprint.iacr.org/2017/200.pdf (Year: 2017).*

Ateniese, Giuseppe et al. "Subversion-Resilient Signatures: Definitions, Constructions and Applications" [online] Steven's Institute of Technology. Oct. 30, 2015 [retrieved Mar. 24, 2021]. Retrieved from Internet: URL: https://citeseerx.ist.psu.edu/viewdoc/download?doi=10.1.1.738.4756&rep=rep1&type=pdf (Year: 2015).*

Camenisch, Jan et al. "Anonymous Attestation with Subverted TPMs," IACR, vol. 20170628:145434, Jun. 28, 2017, pp. 1-79, XP061023745.

Ateniese, Giuseppe et al. "Subversion-Resilient Signature Schemes," IACR, vol. 20150814:120044, Aug. 14, 2015, pp. 1-41, XP061019027.

Ateniese, Giuseppe et al. "Subversion-Resilient Signatures: Definitions, Constructions and Applications," 22nd ACM Conference on Computer and Communications Security, Oct. 2015, pp. 364-375.

Schnorr, C.P. "Efficient Signature Generation by Smart Cards," Journal of Cryptology 4(3), Mar. 1991.

Chaum, David et al. "An Improved Protocol for Demonstrating Possession of Discrete Logarithms and Some Generalizations," EUROCRYPT '87, Apr. 1987.

Chaum, David et al. "Wallet Databases with Observers," Advances in Cryptology—CRYPTO '92, LNCS 740, Dec. 1993, pp. 89-105.

Camenisch, Jan et al. "Practical Verifiable Encryption and Decryption of Discrete Logarithms," CRYPTO 2003, LNCS 2729, Aug. 2003, pp. 126-144.

Groth, Jens et al. "Efficient Non-interactive Proof Systems for Bilinear Groups," IACR Cryptology ePrint Archive 155, Apr. 2007.

Au, Man Ho et al. "Constant-Size Dynamic k-TAA," SCN '06, Sep. 2006.

Brickell, Ernie et al. "Enhanced Privacy ID from Bilinear Pairing," SocialCom/PASSAT, Aug. 2010.

\* cited by examiner

SUBVERSION RESILIENT ATTESTATION FOR TRUSTED EXECUTION ENVIRONMENTS

CROSS-REFERENCE TO RELATED APPLICATION

The present application claims priority to U.S. Provisional Application No. 62/733,660, which was filed on Sep. 20, 2018 and is hereby incorporated by reference.

FIELD

Among other things, the present application discloses subversion resilient attestation for trusted execution environments.

BACKGROUND

Remote attestation is a mechanism offered by modern Trusted Execution Environments (TEEs) that allows remote parties to verify that a host is running binary within a TEE. Remote attestation can be realized through a digital signature scheme. For example, a trusted component on the host computes a digest of the binary, e.g., using a hash function, and signs the digest. The signature is then sent to a remote verifier that checks: (1) that the digest of the binary matches a reference value (e.g., a reciprocally computed hash); and (2) the validity of the received signature by using the verification key corresponding to the signing key of the trusted component.

Because TEEs are involved in privacy-sensitive applications, remote attestation schemes are designed with anonymity protections for the hosts. In particular, remote attestation schemes use group signatures that allows a signing host to remain anonymous within a group of authorized signers (hosts). In these implementations, a remote verifier learns that a given binary is running within a TEE-enabled host, but it does not learn the particular host where the binary is running. Enhanced Privacy ID (EPID) is a group signature scheme with revocation capabilities that is used for remote attestation in modern TEEs such as Intel SGX.

Signature schemes are susceptible to subversion attacks, i.e., where a malicious party surreptitiously modifies a cryptographic scheme with the intent of subverting its security. For example, an adversary may subvert the signing algorithm to exfiltrate information to verifying parties. Subversion attacks can be particularly relevant for remote attestation mechanisms of modern TEEs for mainly two reasons. First, the implementation details of the algorithms that constitute the signature scheme may be unavailable for inspection. Second, a subverted signature scheme may exfiltrate the private signing key, or any other identifying information of the host, thereby compromising host anonymity.

Existing approaches to enhance signature schemes with subversion-resilience rely either on unique signatures or on randomizable signatures. A signature scheme produces unique signatures if, with a fixed verification key, each message has one and one only valid signature. A signature scheme is randomizable if, given a valid signature σ on a message m, any computer can produce a valid signature σ' on m, such that σ' is indistinguishable from a fresh signature on m. For example, Giuseppe Ateniese, Bernardo Magri, and Daniele Venturi, "Subversion-Resilient Signature Schemes," 22nd ACM Conference on Computer and Communications Security, pp. 364-375 2015 (2015)—the entire contents of which are hereby incorporated by reference herein—has shown that unique signatures are resilient to signing algorithm subversion, as are randomizable signatures if a source of trusted randomness is available to the party that randomizes the signature.

SUMMARY

An embodiment of the present invention provides a computer-implemented method that includes receiving an original message from a trusted execution environment. The original message includes an original digital signature authored by the trusted execution environment. The method includes computing a proof of knowledge for the original digital signature and modifying the original message by replacing the original digital signature with the proof of knowledge.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
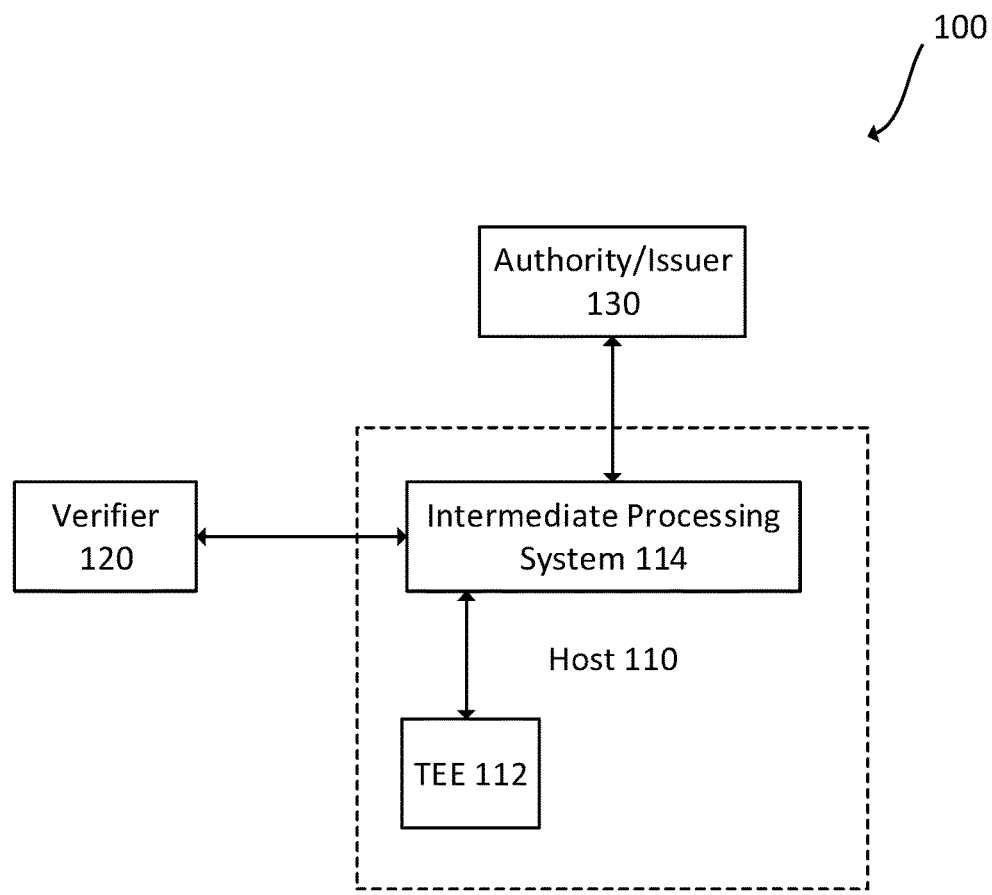
FIG. 1 is a block diagram of an exemplary authentication system.

TEEs, such as Intel SGX, allow remote verifiers to check that a known piece of code is running untampered within a TEE-enabled host. This can be achieved through a trusted system component that certifies (i.e., signs) code running in a local TEE. TEEs can rely on a group signature scheme with revocation capabilities known as Enhanced Privacy ID (EPID). Group signatures appear in remote attestation to anonymize hosts. For example, a remote verifier learns that a piece of code is running within a TEE-enabled host by inspecting a group signature, but the remote verifier does not learn the particular TEE-enabled host running the code.

As described above, existing TEE signature schemes are not subversion-resistant. That is, if the signing algorithm is subverted, the TEE subsystem may exfiltrate identifying information via the signatures it produces. The present application discloses embodiments for providing subversion-resilience to group signature schemes that are not unique/randomizable (e.g., existing TEE signature schemes), thereby making the remote attestation mechanism of modern TEEs robust to signing algorithm subversion attacks. Therefore, the present invention provides a subversion-resilient remote attestation for Trusted Execution Environments (TEEs).

Embodiments of the present invention modify TEE signature schemes to make them subversion-resistant. Embodiments of the present invention provide mechanism to enhance EPID with resilience against subversion attacks. In embodiments of the present invention, a host retains the signature produced by the TEE and provides a verifier with a zero-knowledge proof of knowledge of a valid signature as output by the TEE.

The present invention provides a mechanism to provide subversion resilience to signature schemes used for remote attestation of TEEs that are not unique nor randomizable. Furthermore, the present invention enables a subversion resilient EPID signature scheme. According to an embodiment of the present invention, a host retains a signature generated on a reference binary by the TEE. To offer the verification functionality required for remote attestation, the host uses the signature on the binary provided by the TEE to compute a zero-knowledge proof of knowledge of that signature. Due to the soundness of the proof, a verifier learns that the reference binary is running within a TEE. Due to the zero-knowledge property of the proof, no further information is exfiltrated to the verifier. In an embodiment, the present invention accounts for the revocation mechanisms currently used in EPID. In an embodiment, the present invention modifies the host and the verifier without modifying the existing TEE.

An embodiment of the present inventions provides a method for subversion resilient attestation for trusted execution environments, which includes the following operations: (1) replacing the EPID signature provided by a TEE during remote attestation with a proof of knowledge of that signature; and (2) randomizing the revocation token of EPID provided by a TEE platform during remote attestation before sending it to a verifier.

An embodiment of the present invention provides a method of attestation for a trusted execution environment (TEE) that includes: deploying, by a host having thee TEE, a reference binary in the TEE; receiving, by the host, a request for remote attestation of the reference binary from a remote verifier; issuing, by the TEE of the host, a group signature having a revocation token on the reference binary; withholding, by the host, the group signature; creating, by the host, a proof of knowledge of the group signature; randomizing, by the host, the revocation token; and sending, by the host, the proof of knowledge and the randomized revocation token to the remote verifier. In an embodiment, the group signature may be an Enhanced Privacy Identification (EPID) signature.

An embodiment of the present invention provides a system for subversion resilient attestation for trusted execution environments, the system including a host that is a TEE-enabled platform and a verifier that is remote from the host. The host deploys a reference binary in a TEE subsystem. The remote verifier issues a request for remote attestation of the reference binary. The TEE subsystem on the host issues a (EPID) signature on the reference binary; the signature contains a revocation token that will be used in case this signature will be placed in a revocation list. The host withholds the signature and creates a proof of knowledge of such signature. The host randomizes the revocation token. The host sends to the verifier the proof of knowledge on the signature and the randomized revocation token. The verifier checks the proof of knowledge and retains the revocation token for revocation, if needed.

An embodiment of the present invention provides a host that includes a processor and a memory, the memory having processor executable instructions that, when executed by the processor, cause the processor to perform the following operations for attestation for a trusted execution environment (TEE): deploying a reference binary in the TEE; receiving a request for remote attestation of the reference binary from a remote verifier; receiving, from the TEE, a group signature having a revocation token on the reference binary; withholding the group signature; creating a proof of knowledge of the group signature; randomizing, the revocation token; and sending the proof of knowledge and the randomized revocation token to the remote verifier.

An embodiment of the present invention provides a non-transitory computer readable medium having processor executable instructions that, when executed by a processor, causes the processor to perform the following operations for attestation for a trusted execution environment (TEE): deploying, by a host having a TEE, a reference binary in the TEE; receiving, by the host, a request for remote attestation of the reference binary from a remote verifier; receiving, from the TEE of the host, a group signature having a revocation token on the reference binary; withholding, by the host, the group signature; creating, by the host, a proof of knowledge of the group signature; randomizing, by the host, the revocation token; and sending, by the host, the proof of knowledge and the randomized revocation token to the remote verifier.

Disclosed is a computer-implemented method including: receiving an original message from a trusted execution environment, the original message including an original digital signature authored by the trusted execution environment; computing a proof of knowledge for the original digital signature; and modifying the original message by replacing the original digital signature with the proof of knowledge.

In an embodiment, the method includes: receiving a request for remote attestation of a reference binary from a remote verifier; calculating, with the trusted execution environment and in response to the remote attestation request, the original digital signature based on the reference binary. The original digital signature includes an original revocation token, and the modifying of the original message includes replacing the original revocation token with a randomized revocation token. The method further includes transmitting, to the verifier, the modified original message including the proof of knowledge and the randomized revocation token.

In an embodiment, the original message includes an original revocation token prepared by the trusted execution environment and the method includes: randomizing the original revocation token; modifying the original message by replacing the original revocation token with the randomized revocation token.

In an embodiment, the original message includes a destination address and the method includes transmitting the modified message to the destination address. In an embodiment, the original revocation token is randomized by modifying one or more fields of the original revocation token based on a randomly selected parameter.

In an embodiment, the trusted execution environment locally stores a trusted private key, the trusted execution environment authors the original digital signature with the trusted private key, and the randomized revocation token includes parameters sufficient to revoke the trusted private key. In an embodiment, a host processing system includes an intermediate processing system and the trusted execution environment and the intermediate processing system performs the receiving, the computing, and the modifying.

In an embodiment, the method includes: receiving a request from a verifying processing system for remote attestation of a reference binary; and deploying the reference binary in the trusted execution environment based on the received request.

In an embodiment, the original message includes a digest computed by the trusted execution environment based on the reference binary. In an embodiment, the digest includes a hash of the reference binary.

Disclosed is a processing system including one or more processors configured to: receive an original message from a trusted execution environment, the original message including an original digital signature authored by the trusted execution environment; compute a proof of knowledge for the original digital signature; and modify the original message by replacing the original digital signature with the proof of knowledge.

In an embodiment, the one or more processors are configured to: receive a request for remote attestation of a reference binary from a remote verifier; calculate, within the trusted execution environment and in response to the remote attestation request, the original digital signature based on the reference binary. The original digital signature includes an original revocation token, and the one or more processors are configured to modify the original message by replacing the original revocation token with a randomized revocation token. The one or more processors may be further configured to transmit, to the verifier, the modified original message including the proof of knowledge and the randomized revocation token.

In an embodiment, the processing system includes an intermediate processing system and the trusted execution environment. At least one of the intermediate processing system and the trusted execution environment include the one or more processors.

Disclosed is a non-transitory computer-readable medium including code for configuring one or more processors to: receive an original message from a trusted execution environment, the original message including an original digital signature authored by the trusted execution environment; compute a proof of knowledge for the original digital signature; and modify the original message by replacing the original digital signature with the proof of knowledge.

In an embodiment, the non-transitory computer-readable medium includes code for configuring the one or more processors to: receive a request for remote attestation of a reference binary from a remote verifier; calculate, within the trusted execution environment and in response to the remote attestation request, the original digital signature based on the reference binary. The original digital signature includes an original revocation token, and the code for modifying the original message includes code for configuring the one or more processors to replace the original revocation token with a randomized revocation token. The code further configures the one or more processors to transmit, to the verifier, the modified original message including the proof of knowledge and the randomized revocation token.

Referring to FIG. 1, an authentication system 100 can include a host 110 (also called a host processing system), a remote verifier 120 (also called a verifying processing system), and an issuer/authority 130 (also called an issuing processing system). Host 110 (e.g., the host processing system) can include a TEE 112 (also called a secure enclave) and an intermediate processing system 114. Both TEE 112 and the intermediate processing system 114 can be discrete elements of host 110. TEE 112 can be isolated within host 110 such that information TEE 112 transmits must route through intermediate processing system 114. Host 110 can be distributed such that TEE 112 and intermediate processing system 114 are remote.

TEE 112 can periodically create a message for transmission to verifier 120. TEE 112 can be configured to create such an original message at the request of intermediate processing system 114 and/or verifier 120. The original message can include an original digital signature. TEE 112 can produce the original digital signature with an internally stored (e.g., hard-coded) first private key. The first private key may be one of a first group of private keys cryptographically paired with a first public key.

In the absence of subversion, verifier 120, upon receiving the original message, would only be able to confirm a private key within the first group authored the original digital signature. The verifier 120 would not be able to specifically identify the first private key as the author. However, as stated above, a TEE 112 may be compromised so as to encode uniquely identifying information within the original message (e.g., within the original digital signature of the original message).

Therefore, intermediate processing system 114 can be configured to intercept the message and replace the digital signature with a zero-knowledge proof of knowledge ("ZKPK") such as a non-interactive zero knowledge ("NIZK") proof.

Intermediate processing system 114 can forward the sanitized message to verifier 120. By doing so, intermediate processing system 114 can prevent TEE 112 from leaking (exfiltrating) information that would uniquely identify host 110 through the digital signature. Therefore, intermediate processing system 114 can make TEE 112 subversion-resilient.

Verifier 120 can analyze the ZKPK to confirm that intermediate processing system 114 received an original message with a valid digital signature from TEE 112. Verifier 120 can perform an action based on such a confirmation. For example, verifier dispatch a secret message (e.g., a private symmetric key, an access token, etc.) to host 110 or a third-party processing system based on the confirmation.

In addition to the digital signature and underlying substantive content (e.g., a hash of binary present within TEE 112), the original message can include an original revocation token. In the absence of subversion, TEE 112 can randomly (e.g., pseudo-randomly) select the revocation token from a set of possibilities.

As with the digital signature, intermediate processing system 114 can substitute the original revocation token with a sanitized (i.e., modified) revocation token. Intermediate processing system 114 can do so by re-randomizing the original revocation token (e.g., by selecting another revocation token from the set of possibilities). By doing so, intermediate processing system 114 can prevent TEE 112 from leaking information that would uniquely identify host through the original revocation token.

The above functionality can be implemented through a signature scheme Σ including the following algorithms (also called protocols): Setup, Join, Sign, HostSetup, HostProve, Verify, RevokeP, and RevokeS.

Algorithm Σ.Setup can be run by the issuer (e.g., issuer 130 in FIG. 1) to setup the framework for the signature scheme. Σ.Setup can begin with an initialization algorithm: Init(1λ)→pub. This algorithm takes as input the security parameter λ and outputs public parameter pub. Σ.Setup can operate on public parameter pub to produce a group public key gpk and an issuer secret key isk: Setup(pub)→(gpk, isk). Group public key gpk and issuer secret key isk can form an asymmetric keypair. As shown in FIG. 1, the issuer 130 can be a processing system (called the issuing processing system) separate from both host 110 and verifier 120.

Σ.Join can be an interactive join protocol that enables a TEE to obtain group membership credentials. In an embodiment, $Join_{I,H_i,M_i}\langle(gpk, isk), gpk, gpk\rangle \to \langle b, (b, hvt_i), sk_i\rangle$, a three-party protocol between the issuer $\mathcal{J}$, a host $H_i$ (e. g., intermediate processing system 114) and a chip $\mathcal{M}_i$ (e.g., TEE 112). The issuer inputs (gpk, isk), while the other parties only input gpk. In an embodiment, at the end of the protocol, $\mathcal{J}$ obtains a bit b indicating if the protocol terminated successfully, $\mathcal{M}_i$ (e.g., TEE 112) obtains private key $sk_i$, and $H_i$ obtains a host verification token $hvt_i$ and the same bit b as $\mathcal{J}$. As further discussed below, $\langle d, e, f\rangle \leftarrow P_{A,B,C}\langle a, b, c\rangle$ can be an interactive protocol P between parties A, B and C where a, b, c (resp. d, e, f) are the local inputs (resp. outputs) of A, B and C, respectively.

A TEE 112 equipped with group membership credentials can produce signatures via $\Sigma$.Sign (also called $\Sigma$. Sig): Sign(gpk, $sk_i$, bsn, M, SigRL)$\to \perp/(\sigma, \pi_\sigma)$. According to this embodiment, the signing algorithm takes as input the group public key gpk, a private key $sk_i$, a basename bsn (e.g., an arbitrary string), a message M, and a signature-based revocation list SigRL. The signing algorithm outputs a signature $\sigma$ and a proof $\pi_\sigma$, or an error $\perp$ (if SigRL contains a signature produced with private key $sk_i$).

$\Sigma$.HostSetup can be performed once per host. In an embodiment, this algorithm sets up (e.g., configures intermediate processing system 114 to perform) a non-interactive zero knowledge ("NIZK") proof system for the relation $R_{EPID}$. $R_{EPID}$ can contain all tuples of the following elements: a group public key gpk, a list of revoked signatures SigRL, a basename bsn, a message M, and a randomized revocation token (B', K'). Witnesses can be valid signatures out by Sign(gpk, $sk_i$, bsn, M, SigRL) using a membership key $sk_i$ and a random element $\alpha$.

In an embodiment detail, a tuple ((gpk, SigRL, bsn, M, (B', K')), ($\sigma$, $\alpha$))$\in R_{EPID}$ if and only if:
1. SigRL can be parsed as $\{B_i, K_i\}_{1\le i\le |SigRL|}$.
2. $\sigma=(\sigma_0, \sigma_1, \ldots, \sigma_{|SigRL|})$
3. $\sigma_0=(B, K, T, c, S_x, S_f, S_a, S_b)$ where:
   a. c=H(gpk, B, K, T, $R_1'$, $R_2'$, m)
   b. $R_1'=B^{sf}K^{-c}$
   c. $R_2'=e(T, g_2)^{-sx}e(h_1, g_2)^{sf}e(h_2, g_2)^{sb}e(h_2, w)^{sa}(e(g_1, g_2)/e(T, w))^c$
4. $\sigma_i$ is a valid zero-knowledge proof for SPK$\{(f)$: $K=B^f \land K_i < > B_i^f\}$(m), for $1\le i\le |SigRL|$. SPK can be a signature of knowledge (e.g., a proof of knowledge where the hash used as a challenge is a function of message M).
5. $B'=B^\alpha$
6. $K'=K^\alpha$ By performing items 1-4, intermediate processing system 114 can ensure that the original signature is valid and by performing items 5-6, intermediate processing system 114 can ensure that the sanitized pair (B', K') is a valid re-randomization of a revocation token. In an embodiment, the zero-knowledge proof is a function of $\alpha$. For example, a witness for $R_{EPID}$ can be a pair $\sigma$, $\alpha$ During $\Sigma$.HostSetup, intermediate processing system 114 can be configured to perform Init($1^\lambda$)$\to \omega$, where $\lambda$ is the above-discussed security parameter applied by the issuer during $\Sigma$.Setup, then set gpk*=($\omega$, gpk), where gpk is the group public key generated during $\Sigma$.Setup. Intermediate processing system 114 can send gpk* to the verifier 120. Intermediate processing system 114 may perform the algorithm at every interaction with a verifier (i.e., for every message sent to a verifier) in case the host 110 requires any pairs of interactions with a given verifier to be unlinkable.

Intermediate processing system 114 can perform algorithm $\Sigma$.HostProve($\sigma$)$\to \pi$ (also called HostSanitize) to compute the proof of knowledge (e.g., NIZK) of a signature. Given a signature $\sigma$ on a message M as authored by TEE 112, intermediate processing system 114 can parse $\sigma$ as ($\sigma_0$, $\sigma_i$, \ldots, $\sigma_n$) and $\sigma_0$ as (B, K, T, c, $S_x$, $S_f$, $S_a$, $S_b$). Intermediate processing system 114 can perform the following:
1. Compute (B', K')=($B^\alpha$, $K^\alpha$) for a random $\alpha$ in $Z_p$
2. Run Prove($\omega$, (gpk, SigRL, m, (B', K')), $\sigma$)$\to \pi$
3. Sends $\alpha^*=((B', K'), \pi)$ Algorithm $\Sigma$.Verify(gpk*, m, $\alpha^*$, SigRL, Priv-RL)$\to \Sigma 0/1$ can be performed by verifier 120. In an embodiment, the algorithm parses $\alpha^*$ as ((B', K'), $\pi$) and gpk* as ($\omega$, gpk). If ProofVerify($\omega$, (gpk, m, (B', K'), $\pi$)$\to 1$ and $K<>B'^{f_i}$ for each $f_i \in$Priv-RL, then the algorithm outputs 1; otherwise the algorithm outputs 0. In an embodiment, the verifier applies $\alpha^*$. The notation $\alpha^*$ does not imply a relationship between $\alpha^*$ and $\alpha$, although in an embodiment, $\alpha^*$ proves knowledge of $\alpha$.

Issuer 130 can perform algorithm $\Sigma$.RevokeP(gpk, Priv-RL, $sk_i$)$\to$Priv-RL'. Issuer 130 can take revocation list Priv-RL and secret key $sk_i=f_i$, and outputs Priv-RL'=Priv-RL$\cup\{f_i\}$ Issuer 130 can perform algorithm $\Sigma$.RevokeS(gpk, Priv-RL, SigRL, m, $\sigma$)$\to$SigRL'/$\perp$. Given revocation list SigRL and a signature $\sigma^*$, if $\Sigma$.Verify(gpk*, m, $\alpha^*$, SigRL, Priv-RL)$\to 1$, then output SigRL'=SigRL$\cup\{$(B', K'$)\}$; otherwise output $\perp$.

Figure 2:
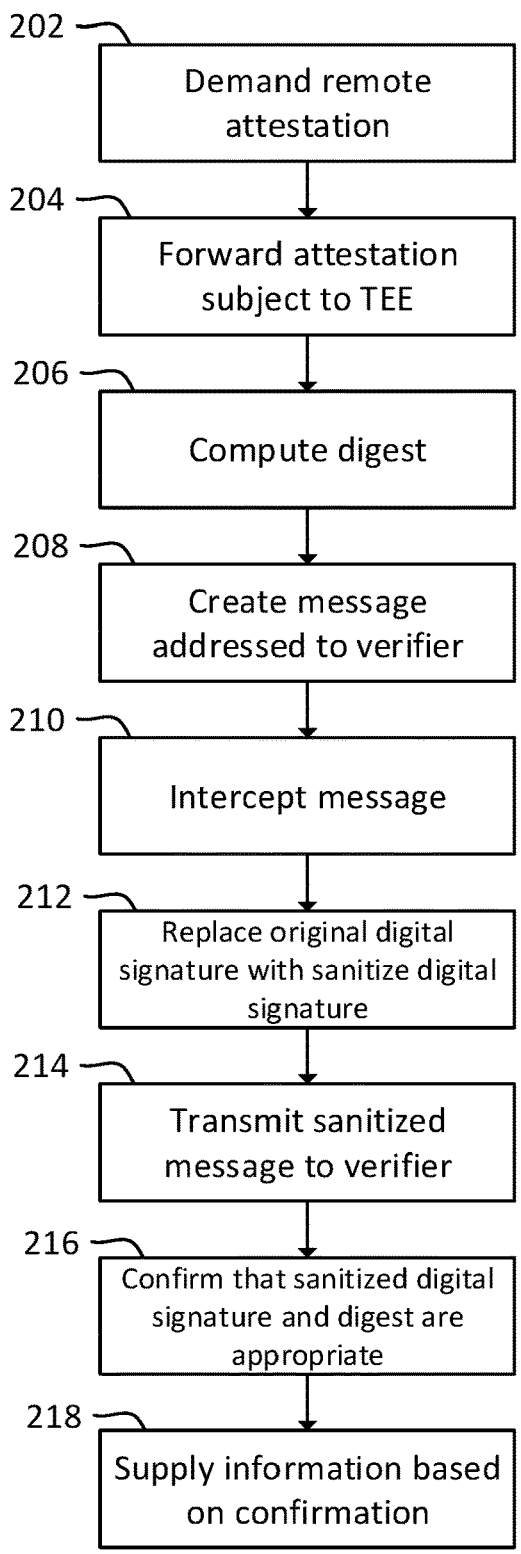
FIG. 2 is a block diagram of an exemplary authentication method.

FIG. 2 illustrates an exemplary remote attestation method. At block 202, a verifying processing system 120 can demand remote attestation of software (e.g., reference binary) stored on a host processing system 110 as a condition precedent to performing an activity (e.g., issuing a symmetric key or other valuable data to host processing system 110) Host processing system 110 can include TEE 112 and intermediate processing system ("IPS") 114.

At block 204, intermediate processing system 114 can receive the demand, and in response, forward the subject of the demand (e.g., software such as reference binary present within intermediate processing system 114) to TEE 112 for computation of a digest authenticating the software. The digest can be, for example, a hash of the software computed according to a hashing algorithm supplied by the verifying processing system 120.

At block 206, TEE 112 can compute the digest. At block 208, TEE 112 can create a message addressed to verifying processing system 120. The message can include an original digital signature authored by TEE 112 and an original revocation token. TEE 112 can compute the digital signature based on group public key gpk, secret key sk_i, basename bsn, substantive content of the message M (e.g., the digest), and the signature-based revocation list SigRL. TEE 112 can transmit the message to verifying processing system 120.

At block 210, intermediate processing system 114 can intercept the message. At block 212, intermediate processing system 114 can compute a sanitized digital signature and a sanitized revocation token. Intermediate processing system 114 can compute the sanitized digital signature based on the group public key gpk, the basename bsn, the substantive message content M (e.g., the digest), the original digital signature, the signature-based revocation list SigRL, and the host verification token hvt_i. Intermediate processing system 114 can compute the sanitized revocation token based on the original revocation token and a randomly selected parameter. In an embodiment, intermediate processing system 114 can raise each parameter of the original revocation token (e.g., B and K) to the power of the randomly selected parameter.

At block 212, intermediate processing system 114 can replace the original digital signature and the original revocation token with the sanitized digital signature and the sanitized revocation token. The original digital signature and original revocation token can be stripped from the message. At block 214, intermediate processing system 114 can transmit the sanitized (also called modified) message to verifying processing system 120. The sanitized message can include the substantive message content M (e.g., the digest), the sanitized digital signature, and the sanitized revocation token. The substantive message content M can be omitted in scenarios where it is already available at the verifier.

At block 216, verifying processing system 120 can confirm that the sanitized digital signature includes a proof of knowledge of the original digital signature and that the substantive message content M (e.g., the digest) is an expected value (e.g., by computing a reciprocal hash of the reference binary). At block 218, and based on confirming that the sanitized digital signature and the substantive message content are appropriate, verifying processing system 120 can supply information to intermediate processing system 114 (e.g., a symmetric key, a digital signature, etc.).

The following description is of proof of relations over discrete logarithms and signature of knowledge according to an embodiment.

A proof of knowledge of a discrete logarithm of an element y of a multiplicative group G with respect to a base g is denoted as $PK\{(x): y=g^x\}$. See, e.g., Claus Schnorr, "Efficient Identification and Signatures for Smart Cards," Journal of Cryptology 4(3) (1991) (the entire contents of which are hereby incorporated by reference herein). This can be accomplished as follows. The prover picks random r and sends $t=g^r$. The verifier responds with random challenge c. The prover sends $s=r+cx$. The verifier accepts the proof if $g^s=ty^c$.

A proof of knowledge of a representation of an element $y \in G$ with respect to several bases $(g_1, \ldots, g_v) \in G^v$ can be denoted $PK\{(x_1, \ldots, x_v): y=g^{x_1}g^{x_2} \ldots g^{x_{v-1}}g_{xv}\}$. See, e.g., David Chaum, Jan-Hendrik Evertse, and Jeroen van de Graaf, "An Improved Protocol for Demonstrating Possession of Discrete Logarithms and Some Generalizations," EUROCRYPT (1987) (the entire contents of which are hereby incorporated by reference). The prover picks random $r_1, \ldots, r_v$ and sends $t_1, \ldots t_v$ where $t_i=g^{r_i}$. The verifier responds with random challenge c. The prover sends $s_1, \ldots, s_v$ where $s_i=r_i+cx_i$. The verifier accepts the proof if $\Pi_{1 \le i \le v} g v_i^{s_i} = \Pi_{1 \le i \le v} t_i y^c$.

A proof of equality of discrete logarithms of two group elements $y_1, y_2 \in G$ to bases $g_1, g_2 \in G$, can be denoted $PK\{(x): y_1=g_1^x \land y_2=g_2^x\}$. See, e.g., David Chaum and Torben Pedersen, "Wallet Databases with Observers," CRYPTO (1992) (the entire contents of which are hereby incorporated by reference). The prover picks random r, computes $t_1=g_1^s$, $t_2=g_2^s$, and sends $(t_1, t_2)$. The verifier responds with random challenge c. The prover sends $s=r+cx$. The verifier accepts the proof if $g^s t_1 y_1^c$ and $g^s=t_2 y_2^c$.

A proof of inequality of discrete logarithms of two group elements $y_1, y_2 \in G$ to bases $g_1, g_2 \in G$, is denoted $PK\{(x): y_1=g_1^x \land y_2 < > g_2^x\}$. See, e.g., Jan Camenisch and Victor Shoup, "Practical Verifiable Encryption and Decryption of Discrete Logarithms," CRYPTO (2003) (the entire contents of which are hereby incorporated by reference). The prover picks random r and sends $c=(g_2/y_2)^r$. Prover and verifier execute the protocol $PK\{(a, b): C=g_2^a(1/y_2)^b \land 1=g_1^a(1/y_1)^b\}$. The verifier accepts if it accepts the previous proof and if $C< >1$.

The above interactive proofs may be converted into non-interactive proofs by replacing the verifier's challenge with a hash computed over the protocol transcript up to the point where the challenge must be provided. For example, in the proof of knowledge of a discrete logarithm of an element $y \in G$ with respect to a base g, the challenge can be computed as $c=H(g, y, t)$. Further, the proof can be converted in a signature of knowledge on a message m, if the input to the hash function includes m. The notation $SPK\{(a): y=ga\}(m)$ is used to denote a signature on a message m obtained in this way.

The following description is of Non-Interactive Zero-Knowledge Proof of Knowledge according to an embodiment.

A non-interactive zero-knowledge (NIZK) proof system for a relation R can be a tuple (Init, Prove, VerifyProof) of probabilistic polynomial-time algorithms such that: Init on input a security parameter outputs a common reference string ω; Prove(ω, x, w) on input $(x, w) \in R$, outputs a proof π; VerifyProof(ω, x, π) given an instance x and a proof π, outputs 0 (reject) or 1 (accept). A NIZK is sound if a prover has negligible chances of producing convincing proofs for statements outside of R, while the NIZK is zero-knowledge if a verifier learns nothing from a proof (apart from the fact that the proof is valid). NIZK for arbitrary relations are available, for example Jens Groth and Amit Sahai, "Efficient Non-interactive Proof Systems for Bilinear Groups," IACR Cryptology ePrint Archive 155 (2007)—the entire contents of which are hereby incorporated by reference.

The following description is of a BBS+ Signature scheme according to an embodiment:

An EPID can be built on top of a BBS+ signature scheme. See, e.g., Man Ho Au, Willy Susilo, and Yi Mu, "Constant-Size Dynamic k-TAA," SCN (2006) (discussing BBS+ signatures—the entire contents of which are hereby by incorporated by references herein).

Here, $(G_1, G_2)$ are a suitable bilinear group pair of some prime order p. And, $e: G_1 \times G_2 \rightarrow G_T$ are a computable bilinear pairing function. The BBS+ scheme can unfold as follows:

BBS.KeyGen($1^\lambda$)→(pk, sk). The key generation algorithm takes as input security parameter λ. It randomly picks $(g_1, h_1, h_2) \in G_1^3$, $g_2 \in G_2$, and $\gamma \in Z_q$. It sets $w=g_2^\gamma$ and outputs $pk=(p, G_1, G_2, G_T, g_1, h_1, h_2, w)$ and $sk=\gamma$.

BBS.Sign(pk, sk, m)→σ. The signing algorithm takes a pair of public-private keys and a message m. It outputs a signature σ=(A, x, y), where (x, y) are random elements of $Z_p^*$ and $A=(g_1 h_1^m h_2^y)^{1/(x+\gamma)}$.

BBS.Verify(pk, m, σ)→0/1. The verification algorithm outputs 1 (i.e., valid signature) if $e(A, g_2^x w)=e(g_1 h_1^m h_2^y, g_2)$; otherwise it outputs 0.

The following description is of Enhanced Privacy ID (EPID) according to an embodiment:

Enhanced Privacy ID (EPID) is a group signature scheme with provisions for revocation. EPID includes four different types of entities: (1) an issuer I who manages group membership; (2) a revocation manager R who manages revocation of group members (As shown in FIG. 1, I and R can be the same entity); (3) a set of group members; and (4) a set of verifiers.

Group membership is regulated by I, who provides a member $M_i$ with a secret key $sk_i$ via a join protocol. Member $M_i$ uses its secret key to issue signatures that anybody can verify. A valid signature convinces the verifier that the signer is a member of the group, but does not allow the verifier to learn $M_i$'s identity.

A revocation manager R can, if needed, revoke group membership. In particular, EPID provides two different kind of revocation lists: one is called Priv-RL and is constituted by the secret keys of the revoked members, while the other is called SigRL and includes (part of the) signatures generated by revoked members. The latter is used when a member must be revoked, but its private key is not available.

Notation:

In the following, $<c, d> \leftarrow P_{A,B}<a, b>$ is referred to as an interactive protocol P between parties A and B, where A's private input is a and B's private input is b. The protocol returns private output c to A and private output d to B.

EPID can be described as a tuple (Setup, Join, Sign, Verify, RevokeP, RevokeS) defined as follows:

Setup($1^\lambda$)→(gpk, isk). This algorithm is run by the issuer I. It takes a security parameter $\lambda$, as input and outputs a group public key gpk and an issuer secret key isk.

$<\perp, sk_i> \leftarrow \text{Join}_{I,Mi}<\text{(gpk, isk), gpk}>$. This is an interactive protocol between issuer I and prospective member $M_i$. Both parties input the group public key, while the issuer also inputs its secret key. At the end of the protocol the issuer outputs nothing ($\perp$) while member $M_i$ outputs secret key $sk_i$.

Sign(gpk, $sk_i$, m, SigRL)→$\perp/\sigma$. The signing algorithm takes as input the group key public gpk, signing key $sk_i$, a message m, and a signature revocation list SigRL. It outputs either a valid signature $\sigma$ or an error message $\perp$.

Verify(gpk, Priv-RL, SigRL, m, $\sigma$)→0/1. The signature verification algorithm takes as input the group public key gpk, both revocation lists Priv-RL and SigRL, a message m, and a signature $\sigma$. It outputs 1 if $\sigma$ is a valid signature on m; otherwise it outputs 0.

RevokeP(gpk, Priv-RL, $sk_i$)→Priv-RL'. This algorithm outputs an updated revocation list by adding secret key $sk_i$ to the input list Priv-RL.

RevokeS(gpk, Priv-RL, SigRL, m, $\sigma$)→SigRL'/$\perp$. If signature $\sigma$ is valid for message m, this algorithm outputs an updated revocation list by adding a part of $\sigma$ to the input list Priv-RL; otherwise the algorithm outputs an error message $\perp$.

The following description is of an instantiation of Enhanced Privacy ID (EPID) according to an embodiment.

An example instantiation of EPID—adopted by Intel SGX—is discussed in Ernie Brickell and Jiangtao Li, "Enhanced Privacy ID from Bilinear Pairing for Hardware Authentication and Attestation," SocialCom/PASSAT (2010) ("Brickell")—the entire contents of which is hereby incorporated by reference. NIZK—e.g., as proposed in Brickell—may be used by an embodiment of the present invention. At a high level, a dedicated service by the platform manufacturer acts as issuer and revocation manager. There may be several groups. However, without loss of generality, the present example assumes that there is only one group.

The issuer sets up the group via the Setup algorithm. Any platform can become a member of the group by choosing a secret key f, and engaging with the issuer I in the Join interactive protocol. During the protocol, the platform outputs a BBS+ signature $\sigma=(A, x, y)$ over f, computed with the issuer secret key. The signature $\sigma$ and the secret key f constitute the platform's credentials as a group member.

A signature by a TEE is essentially a zero-knowledge proof that the TEE has a BBS+ signature on its secret key f. Further, given a revocation list SigRL of signatures produced by revoked members, a valid signature must also include a proof that the secret key f may have not produced any of the signatures in SigRL. Finally, the TEE also picks a random base B, computes $K=B^f$ and proves in zero-knowledge that K was computed correctly from B and f. The pair (B, K) is denoted as a revocation token; this is provided to the verifier and may be added to SigRL by the revocation manager R later on.

The following is an algorithm implemented by embodiments of the present invention:

Setup($1^\lambda$)→(gpk, isk). On input security parameter $\lambda$, it runs BBS.KeyGen($1^\lambda$)→(pk, sk) and sets gkp=pk and isk=sk.

$<\perp, sk_i> \leftarrow \text{Join}_{I,Mi}<\text{(gpk, isk), gpk}>$. This is an interactive protocol between platform $M_i$ and issuer I that unfolds as follows:
1. $M_i$ picks (f, y')$\in Z_p^2$ and computes $t=h_1^f h_2^{y'}$ and produces a proof $\pi=\text{PK}\{(f, y):t=h_1 f_2^{y'}\}$.
2. The issuer verifies $\pi$, computes $A=(g_1 h_1^m h_2^{y''})^{1/(x+\gamma'')}$ where (x, y'') are random elements of $Z_p$, and outputs (A, x, y)
3. M computes $y=y'+y''$ and checks that $e(A, g_2^x w)=e(g_1 h_1^m h_2^y, g_2)$. It outputs $sk_i=(A, x, y, f)$.

Sign(gpk, $sk_i$, m, SigRL)→$\perp/\sigma$. Given the group public key gpk, a member's credentials $sk_i=(A, x, y, f)$ and a message m$\in\{0,1\}^*$, the signing algorithm unfolds as follows:
1. Pick random $B\in G_T$ and random $a\in Z_p$ and compute $K=B^f$, b=y+ax, $T=Ah_2^a$
2. Compute SPK{(x, f, a, b):$B^f=K \wedge e(T, g_2)^{-x}e(h_1, g_2)^f e(h_2, g_2)^b e(h_2, w)^a=e(T, w)/e(g_1, g_2)$}(m)
   a. Compute $R_1=B^{rf}$, $R_2=e(T, g_2)^{-rx}e(h_1, g_2)^{rf}e(h_2, g_2)^{rb}e(h_2, w)^{ra}$, where $r_x$, $r_f$, $r_a$, $r_b$ are random elements of $Z_p$.
   b. Compute $c=H(\text{gpk}, B, K, T, R_1, R_2, m)$ and $s_x=r_x+cx$, $s_f=r_f+cf$, $s_a=r_a+ca$, $s_b=r_b+cb$.
3. Set $\sigma_0=(B, K, T, c, S_x, S_f, S_a, S_b)$.
4. Given SigRL=$\{B_i, K_i\}_{1\leq i\leq|SigRL|}$, compute $\sigma_i$=SPK$\{(f): K=B^f \wedge K_i<>B_i^f\}$(m) for $1\leq i\leq|SigRL|$.
5. If any of the zero-knowledge proofs above fails, output $\perp$, otherwise output $\sigma=(\sigma_0, \sigma_1, \ldots, \sigma_{|SigRL|})$.

Verify(gpk, Priv-RL, SigRL, m, $\sigma$)→0/1. Let $\sigma=(\sigma 0, \sigma 1, \ldots, \sigma|SigRL|)$ where $\sigma 0=(B, K, T, c, sx, sf, sa, sb)$.
1. Verify that $(B, K, T, S_x, S_f, S_a, S_b) \in G_T \times G_T \times G_1 \times Z_p^4$.
2. Compute $R_1'=B^{sf}K^{-c}$ and $R_2'=e(T, g_2)^{-sx}e(h_1, g_2)^{sf}e(h_2, g_2)^{sb}e(h_2, w)^{sa}(e(g_1, g_2)/e(T, w))^c$
3. Verify that $c=H(\text{gpk}, B, K, T, R_1', R_2', m)$.
4. Given SigRL=$\{B_i, K_i=B_i^{fi}\}_{1\leq i\leq|SigRL|}$, verify that $\sigma_i$ is a valid zero-knowledge proof for SPK$\{(f):K=B^f \wedge K_i<>B_i^f\}$(m), for $1\leq i\leq|SigRL|$.
5. For each $f_i\in$Priv-RL, check that $K<>B^{fi}$.

RevokeP(gpk, Priv-RL, $sk_i$)→Priv-RL'. Output Priv-RL'=Priv-RL$\cup\{sk_i\}$.

RevokeS(gpk, Priv-RL, SigRL, m, $\sigma$)→SigRL'/$\perp$. If $S_{SGX}$. Verify(gpk, Priv-RL, SigRL, m, $\sigma$)→1, then output SigRL'=SigRL$\cup\{(B', K')\}$; otherwise output $\perp$.

Figure 3:
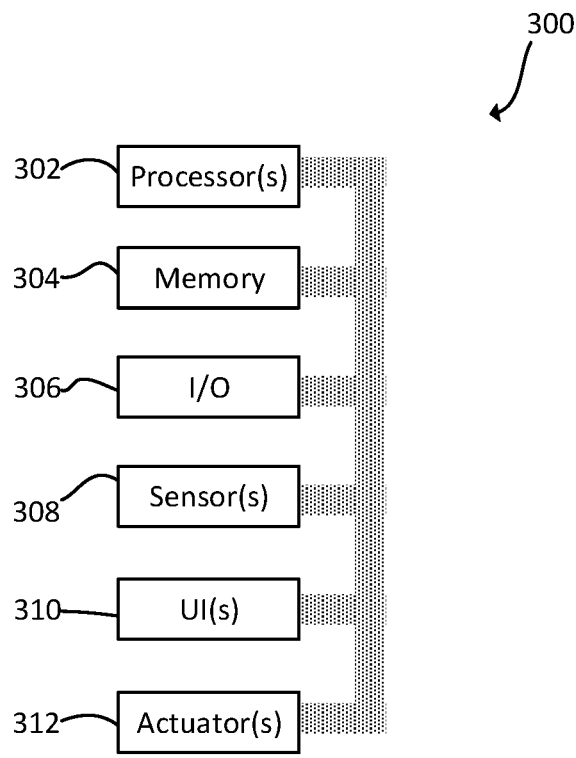
FIG. 3 is a block diagram of an exemplary processing system.

Referring to FIG. 3, a processing system 300 can include one or more processors 302, memory 304, one or more input/output devices 306, one or more sensors 308, one or more user interfaces 310, and one or more actuators 312. Processing system 300 can be representative of each of host 110, TEE 112, intermediate processing system 113, verifier 120, and the issuer 130.

Processors 302 can include one or more distinct processors, each having one or more cores. Each of the distinct processors can have the same or different structure. Processors 302 can include one or more central processing units (CPUs), one or more graphics processing units (GPUs), circuitry (e.g., application specific integrated circuits (ASICs)), digital signal processors (DSPs), and the like. Processors 302 can be mounted on a common substrate or to different substrates.

Processors 302 are configured to perform a certain function, method, or operation at least when one of the one or more of the distinct processors is capable of executing code (e.g., interpreting scripts), stored on memory 304 embodying the function, method, or operation. Processors 302, and thus processing system 300, can be configured to perform, automatically, any and all functions, methods, and operations disclosed herein.

For example, when the present disclosure states that processing system 300 performs/can perform task "X" (or that task "X" is performed), such a statement should be understood to disclose that processing system 300 can be configured to perform task "X". Processing system 300 are configured to perform a function, method, or operation at least when processors 302 are configured to do the same.

Memory 304 can include volatile memory, non-volatile memory, and any other medium capable of storing data. Each of the volatile memory, non-volatile memory, and any other type of memory can include multiple different memory devices, located at multiple distinct locations and each having a different structure. Memory 304 can include cloud storage.

Examples of memory 304 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code (e.g., scripts) saved in memory 304.

Input-output devices 306 can include any component for trafficking data such as ports, antennas (i.e., transceivers), printed conductive paths, and the like. Input-output devices 306 can enable wired communication via USB®, DisplayPort®, HDMI®, Ethernet, and the like. Input-output devices 306 can enable electronic, optical, magnetic, and holographic, communication with suitable memory 304. Input-output devices 306 can enable wireless communication via WiFi®, Bluetooth®, cellular (e.g., LTE®, CDMA®, GSM®, WiMax®, NFC®), GPS, and the like. Input-output devices 306 can include wired and/or wireless communication pathways.

Sensors 308 can capture physical measurements of environment and report the same to processors 302. User interface 310 can include displays, physical buttons, speakers, microphones, keyboards, and the like. Actuators 312 can enable processors 302 to control mechanical forces.

Processing system 300 can be distributed. Processing system 300 can have a modular design where certain features have a plurality of the aspects shown in FIG. 3. For example, I/O modules can include volatile memory and one or more processors.

The following disclosure provides further description of exemplary embodiments of the invention.

Enhanced Privacy ID (EPID) is signature scheme underlying anonymous attestation in Intel SGX. Disclosed is a subversion resilient EPID scheme (or SR-EPID). SR-EPID provides the same functionality and security guarantees of the original EPID, despite a potentially subverted chip (e.g., TEE 112). In this design, the host (e.g., intermediate processing system 114 of host 110) acts as a "sanitizer" and ensures no covert channel between the chip (e.g., TEE 112) and the outside world both during enrollment and during attestation (i.e., when signatures are produced). It can do so by leveraging structure preserving signatures in combination with Groth-Sahai proof system. As used herein, the term host 110 can refer to both intermediate processing system 114 and TEE 112 or intermediate processing system 114 specifically.

The above-described approach has a number of advantages. First, the host (e.g., intermediate processing system 114) bears no secret information—hence, a memory leak does not erode security. Further, the role of sanitizer may be distributed in a cascade fashion among several parties (e.g., multiple components of intermediate processing system 114) so that sanitization becomes effective as long as one of the parties has access to a good source or randomness. This approach is suited for corporate environments where security gateways process outgoing messages before they are released. The signing protocol can be non-interactive, thereby minimizing latency during signature generation. The instantiation of SR-EPID is secure against adaptive corruptions.

Different from existing approaches, signatures in SR-EPID can be produced by the chip via a non-interactive algorithm. The host can be leveraged to ensure security despite a subverted chip, but is not required to store a secret outside of TEE 112. In SR-EPID the host can act as a sanitizer: it runs a special verification of the signature produced by the chip; if this verification passes, the hosts strips off a piece of the signature, and forwards a re-randomization of the remaining part to the verifier (e.g., verifier 120).

The disclosed approach comes with multiple benefits. First, signature generation can be non-interactive and the communication flow can be unidirectional (from the chip to the host, on to the verifier)—just like the original EPID scheme and its instantiation within Intel SGX. This decreases latency and provides more flexibility in the protocol flow as the sanitization of a signature does not need to be done online. Non-interactive signature generation places a higher toll on the signer, but this is not an issue for secure hardware like Intel SGX that leverages the full power of the main processor.

Another benefit is that the host (i.e., intermediate processing system 114) holds no secret and only needs to store a verification key, which can even be made public without invalidating anonymity or unforgeability. This means that if a memory leak occurs on the host, one has nothing to recover but public information that is useless even if the chip is subverted. This property does not hold in existing approaches, where an attacker may ship a subverted hardware with a hardcoded signing key share, and a memory leak on the host would allow to get the host's share of the signing key; once the full signing key is known, unforgeability and anonymity are essentially lost.

In an embodiment, the host needs to have access to good randomness that should not be leaked; this is to re-randomize the signatures produced by a possibly subverted chip. However, the re-randomization is non-interactive and requires no long-term secret. Therefore, re-randomization can be executed by multiple parties in a cascade fashion in such a way that the signature is properly re-randomized as long as at least one of these parties has good randomness.

This modus operandi may fit corporate environments where hosts themselves may not be trusted with preventing information exfiltration, and security checks are carried out by one or more company gateways. It is not clear how to achieve such "fault tolerance" in various existing split-signature approaches. One may split the signing key across several parties, but the non-interactive nature of the signing protocol would lead to high latency for signature generation.

An embodiment formalizes the notion of Subversion-Resilient EPID schemes and includes a construction based on bilinear pairings. The construction leverages structure preserving signatures in combination with Groth-Sahai proof system and achieves security against adaptive corruptions.

In an embodiment consistent with FIG. 1, the issuer authority $\mathcal{I}$ 130 (e.g., Intel in case of SGX) manages group(s) and certifies secret keys. A group member is a platform $\mathcal{P}$ (labeled host 110 in FIG. 1) including a host $\mathcal{H}$ (labeled intermediate processing system 114 in FIG. 1), and a chip $\mathcal{M}$ (labeled TEE 112 in FIG. 1) holding the signing key. In case of SGX, the chip $\mathcal{M}$ is the so-called quoting enclave, whereas the host $\mathcal{H}$ is constituted by the remaining hardware and software on the platform.

The quoting enclave can be the only component within host H with access to the attestation (i.e., EPID) signing key. This certified secret key never leaves the chip as it features tamper-resistant storage. Platform authentication by remote verifiers $\mathcal{V}$ is achieved by having the platform issuing a signature on a (challenge) message. By verifying the validity of the signature, the verifier is assured that the platform is a valid group member but cannot identify the platform among those belonging to the same group. Arrows in FIG. 1 depict available communication channels; all communication between the chip and the outside world is mediated by the host (i.e., intermediate processing system 114). The same model holds for anonymous attestation using TPMs; in this case, the chip is the TPM and the host is any other hardware and the software on the same platform.

In order to guarantee security in the presence of a subverted chip $\mathcal{M}$, host to "sanitizes" signatures produced by the chip so to eliminate any covert channel between the chip and the outside world.

A covert channel could, for example, leverage nonces chosen by the chip during signature generation. Alternatively, a subverted chip may run the join protocol—when the private key is certified by the group manager—with a private key known to the adversary; later on, the adversary may simply use this known private key to break platform anonymity (since, by definition, private key based revocation allows a verifier to tell if a signature has been produced with a given private key). Another option is for the chip to behave honestly during the join protocol, but later use a preloaded private key to produce signatures (since platform anonymity must hold also against a malicious group authority, it is possible for the hardware to be preloaded with one or more certified private keys). The adversary may use that known (preloaded) key and a signature to break platform anonymity.

To deal with these issues, an embodiment of SR-EPID is designed so that (i) the host (e.g., intermediate processing system 114) participates to the join protocol contributing to the private key of the chip, (ii) each signature output by the chip (e.g., TEE 112) carries a proof (for the host to verify) that the private key used for signing is the very same one certified during the join protocol, and (iii) the host sanitizes signatures to avoid covert channel based on maliciously-sampled nonces.

$\langle d, e, f \rangle \leftarrow P_{A,B,C}\langle a, b, c \rangle$ is an interactive protocol P between parties A, B and C where a, b, c (resp. d, e, f) are the local inputs (resp. outputs) of A, B and C, respectively. As discussed below, an embodiment of SR-EPID can include algorithms (also called protocols) Join, Init, Setup, Sig, Ver, and Sanitize. All the algorithms except Init take one or more public parameters generated by Init as an input. For convenience, this input is implicit in the following description.

Init($1^\lambda$)→pub. This algorithm takes as input the security parameter $\lambda$ and outputs public parameters pub.

Setup(pub)→(gpk, isk). This algorithm takes the public parameters pub and outputs a group public key gpk and an issuing secret key isk for the issuer I.

$\text{Join}_{I,H_i,M_i}\langle(\text{gpk, isk}), \text{gpk, gpk}\rangle \rightarrow \langle b, (b, \text{hvt}_i), \text{sk}_i \rangle$. This is a three-party protocol between the issuer $\mathcal{I}$, a host $\mathcal{H}$ i and a chip $\mathcal{M}$ i. The issuer inputs (gpk, isk), while the other parties only input gpk. At the end of the protocol, $\mathcal{I}$ obtains a bit b indicating if the protocol terminated successfully, $\mathcal{M}$ i obtains private key ski, and $\mathcal{H}$ i obtains a host verification token hvti and the same bit b of $\mathcal{I}$.

Sig(gpk, $\text{sk}_i$, bsn, M, SigRL)→⊥/($\sigma$, $\pi_\sigma$). The signing algorithms takes as input the group public key gpk, a private key $\text{sk}_i$, a basename bsn, a message M, and a signature based revocation list SigRL. It outputs a signature $\sigma$ and a proof $\pi_\sigma$, or an error ⊥ (if SigRL contains a signature produced with $\text{sk}_i$).

Ver(gpk, bsn, M, $\sigma$, SigRL, PrivRL)→0/1. The verification algorithm takes in input the group public key gpk, a basename bsn, a message M, a signature $\sigma$, a signature based revocation list SigRL, and a private key based revocation list PrivRL. It outputs 0 or 1 if $\sigma$ is respectively an invalid or a valid signature on M.

Sanitize (gpk, bsn, M, ($\sigma$, $\pi_\sigma$), SigRL, $\text{hvt}_i$)→⊥/$\sigma$'. The sanitization algorithm takes as input the group public key gpk, a basename bsn, a message M, a signature $\sigma$ with corresponding proof $\pi_\sigma$, a signature based revocation list SigRL, and a host verification token $\text{hvt}_i$. It outputs either ⊥ or a sanitized signature $\sigma$'.

Link(gpk, bsn, $M_1$, $\sigma_1$, $\text{SigRL}_1$, $M_2$, $\sigma_2$, $\text{SigRL}_2$)→0/1. The linking algorithm takes as input the group public key gpk, a basename bsn, and two message-signature-SigRL triples $M_1$, $\sigma_1$, $\text{SigRL}_1$ and $M_2$, $\sigma_2$, $\text{SigRL}_2$. It outputs 1 if both signatures are valid and were created, on the same basename, by the same platform; it outputs 0 otherwise.

In an embodiment, PrivRL is a set of private keys $\{\text{sk}_i\}$i, and SigRL is a set of triples $\{(\text{bsn}_i, M_i, \sigma_i)\}$ i, each including (e.g., consisting of) a basename, a message and a signature.

Correctness: An SR-EPID scheme satisfies correctness if any signature produced by a non-revoked platform passes the verification procedure. More formally, for all pub←Init ($1^\lambda$), all (gpk, gsk)←Setup(pub), all $\langle b, (b, \text{hvt}), \text{sk}\rangle$←Join $\langle$(gpk, gsk), gpk, gpk$\rangle$ such that b=1, and for any basename bsn, message M, private-key revocation list PrivRL and signature revocation list SigRL, and any signature $\sigma$←Sanitize(gpk, bsn, M, Sig(gpk, sk, bsn, M, SigRL), SigRL, hvt) the following expression is obtained where Σ is the set of signatures produced with sk:

Ver(*gpk,bsn,M*,σ,SigRL,PrivRL)=1⇒(*sk*∉PrivRL)∧
(Σ∩SigRL=∅)

An exemplary construction includes the following template: (I) The issuer $\mathcal{I}$ keeps a secret key isk of a (structure-preserving) signature scheme and, in an embodiment, the secret key of a platform is a signature $\sigma_{sp}$ on a Pedersen commitment $[t]_1$ whose opening y is known to the platform only (in other words $\sigma_{sp}$ is a blind signature on y). (II) The chip generates a signature on a message M by creating a signature of knowledge for M of a signature $\sigma_{sp}$ made by $\mathcal{I}$ on a commitment $[t]_1$ that opens to y. To glue the message M with $\sigma_{sp}$ the proof is created using a labeled NIZK, where the label is, indeed, the message M.

A feature for preventing subversion attacks is to let the host $\mathcal{H}$ re-randomize every signature produced by the chip $\mathcal{M}$, eliminating in this way the possibility that the randomness chosen by $\mathcal{M}$ in the signature of knowledge be a covert channel. Technically, this is achieved by using re-randomizable NIZKs.

This feature, however, can be insufficient to counter other possible subversion attacks. Not only the signatures, but also the execution of the Join protocol can give rise to a covert channel between the chip and the adversary. For example, the chip $\mathcal{M}$ may choose a hardcoded secret y as its secret platform key. For this, the host $\mathcal{H}$ also contributes to this key. And more in general potential covert channels in the Join protocol can be eliminated by letting the host re-randomize any message and NIZK that go from the chip to the issuer.

Another potential attack vector is that after the Join protocol is over, a subverted chip may use a completely different secret key y' to generate signatures. In particular a chip subverted by a malicious issuer may come with such y' together with a valid signature $\sigma'_{sp}$ for it. To contrast this class of attacks, $\mathcal{M}$ can be required to output, for each signature $\sigma$, a proof $\pi_\sigma$ that it is generated with the same secret key obtained Join. $\mathcal{H}$ can check $\pi_\sigma$ using a dedicated verification token (also obtained at the end of the Join protocol); if the check passes, $\mathcal{H}$ strips off $\pi_\sigma$, and returns a re-randomization of $\sigma$.

Disclosed are another set of techniques to reconcile an extensive use of (Groth-Sahai) NIZKs with the goal of obtaining an efficient SR-EPID scheme.

An embodiment requires two seemly conflicting properties of NIZK proof systems. On the one hand, the embodiment extracts from the malicious platforms the secret keys after the join protocols are executed; on the other hand, the embodiment uses zero-knowledge and strong derivation privacy to disable any covert channel from an honest platform with a subverted chip. The embodiment can rely on a simulation-extractable (and malleable) NIZK scheme. In an embodiment, any re-randomization algorithm is able to change the hash value to a fresh one without the knowledge of the witness, which is in contrast with the special soundness of the sigma-protocols.

In a construction, the expensive use of simulation-extractable (and malleable) GS proofs is avoided by using a novel combination of (plain) GS proofs with the random oracle model. At the beginning of the join protocol, the issuer chooses a fresh identifier id which the parties hash with a random oracle J, and its output is used as a fresh common-reference string. All the NIZKs sent by the platform during Join will use this fresh common reference string. In this way, by programming the random oracle, in the reduction one can adaptively choose the flavor of common reference string needed, depending on the kind of corruption of the platform.

However, this strategy may only partially succeed when using GS proof systems. The random oracle can be used to program the part in $\mathbb{G}_1$ of the common reference strings of a GS proof system. Interestingly, this still allows the technique to work if the relation's witnesses to be extracted are only in $\mathbb{G}_1$.

A similar problem may arise for the NIZK proof system for generating the signatures: it can be desirable to use zero-knowledge and strong derivation privacy for all the signatures released by honest platforms with subverted chips, and be able to extract (one single) forged signature during the unforgeability experiment. An embodiment may be unable to afford to have all the elements of the witness be group elements in $\mathbb{G}_1$. For this reason, disclosed are knowledge of a commitment $[t]_1$ and of its opening $[y]_2$. Unfortunately, this asymmetry cannot be broken when using Type-3 pairings.

To solve this problem a random oracle can be used together with ABO-NIZKs and the fact that, in the reduction, only one NIZK proof needs be extractable. An embodiment is configured to hash the signed message M (together with the basename bsn) using another random oracle H, and then use the label H (bsn, M) in the labeled NIZK. Abstractly, in the proof of security, by programming the random oracle H, the embodiment lifts the selective security offered by the ABO-NIZK systems to obtain adaptive security. For the disclosed instantiation based on the external Diffie-Hellman assumption, the computational complexity of an ABO-NIZK prover (and verifier) may be only three exponentiations less efficient than a not-labelled GS-NIZK, while the size of the NIZK proofs remains the same.

Building Blocks. In an embodiment, a scheme works over bilinear groups generated by a generator $\mathcal{G}$, and it makes use of the following building blocks:

[First building block] A structure-preserving signature scheme $\mathcal{SS}$ =(KGen$_{sp}$, Sig$_{sp}$, Ver$_{sp}$) where messages are elements of $\mathbb{G}_1$ and signatures are in $\mathbb{G}_1^{l_1} \times \mathbb{G}_2^{l_2}$.

[Second building block] An ABO label-based re-randomizable NIZK $\Pi_{sign}$ with label space being $\{0, 1\}^\lambda$ and for the relationship $\mathcal{R}_{sign}$ defined as:

$$\left\{ \begin{array}{l} (gpk, [b]_1, SigRL), \\ ([t]_1, \sigma_{sp}, [y]_2) \end{array} : \begin{array}{l} [b]_1 \in \text{span}([1, y_0]_1^T) \\ \forall i: [b_i]_1 \notin \text{span}([1, y_0]_1^T) \\ [t]_t = [h^T \cdot y]_t \end{array} \right\}$$

$$Ver_{sp}(pk_{sp}, [t]_1, \sigma_{sp}) = 1$$

In the above expression, SigRL=$\{[b_i]_1\}_{i=1}^r$, gpk=$([h]_1$, pk$_{sp})$, and y=$(y_0, y_1)^T$. To simplify the exposition, the description of the protocol below omits gpk (the public key of the scheme) from the instance and considers $([b]_1$, SigRL) as an instance for the relation.

[Third building block] A malleable and re-randomizable GS-NIZK $\mathcal{NIZK}_{com}$ for the following relationship $\mathcal{R}_{com}$ and set of transformations $\mathcal{T}_{com}$ defined below:

$$\{([h]2, [t]2), [y]1 : e([1]1, t[2]) = e([y]1, [h]2)\}$$

$$\left\{ T = (T_x, T_w): \begin{array}{l} T_x([h]2, [t]2) = [h]2, [t + h_2 \cdot y']_2 \\ T_w([y]1) = [y0, y1 + y']_1^T \end{array} \right\}$$

Namely, the relation proves the knowledge (in $\mathbb{G}_1$) of the opening of a Pedersen's commitment (in $\mathbb{G}_2$) whose commitment key is $[h]_2$. The transformation allows to re-randomize the commitment by adding fresh randomness. The common reference string of the NIZK is a vector in $\mathbb{G}_1^l \times \mathbb{G}_2^l$.

[Fourth building block] A $\mathcal{NIZK}_{hvt}$ for the relation $\mathcal{R}_{hvt}$=$\{[x, xy, z, zy]1, y:x, y, z \in \mathbb{Z}_p\}$.

[Fifth building block] Three cryptographic hash functions H, J and K modeled as random oracles, where H:$\{0, 1\}^* \to \{0, 1\}^\lambda$, J:$\{0, 1\}^* \to \mathbb{G}_1^l$ and K:$\{0, 1\}^\lambda \to \mathbb{G}_1$, and the value $\ell \in \mathbb{N}$ depends only on the NIZK $\mathcal{NIZK}_{com}$.

The following describes an embodiment of a SR-EPID scheme:

Init($1^\lambda$)→pub: Generate description of a type-3 bilinear group bgp $\xleftarrow{\$} \mathcal{G}(1^\lambda)$, the common reference strings $crs_{sign} \xleftarrow{\$} \mathcal{NIZK}_{sign}$. Init(bgp), $crs_{com,2}$, $tp_s \xleftarrow{\$} \mathcal{NIZK}_{sign}$. $\overline{Init}_2$ (bgp), and $crs_{hvt} \xleftarrow{\$} \mathcal{NIZK}_{sign}$. Init(bgp), and sample $h \xleftarrow{\$} \mathbb{Z}_p^2$. Output pub=(bgp, $crs_{sign}$, $crs_{com,2}$, $crs_{hvt}$, $[h]_1$, $[h]_2$).

Setup(pub)→(gpk, isk): sample $(sk_{sp}, pk_{sp}) \xleftarrow{\$} KGen_{sp}$ (bgp), and set isk:=$sk_{sp}$, gpk:=$pk_{sp}$.

Join$_{\mathcal{I,H,M}}$ ⟨(gpk, isk), gpk, gpk⟩→⟨b, (b, hvt), (sk, hvt)⟩: the platform $\mathcal{P} = (\mathcal{M}, \mathcal{H})$ and issuer $\mathcal{I}$ start an interactive protocol that proceeds as described below:

1. $\mathcal{I}$ samples id $\xleftarrow{\$} \{0,1\}^\lambda$ and send id to $\mathcal{H}$ and $\mathcal{M}$. All the parties compute $crs_{com,1} \leftarrow J(id)$ and set $crs_{com} := (crs_{com,1}, crs_{com,2})$.

2. $\mathcal{H}$ samples $y_0, c \xleftarrow{\$} \mathbb{Z}_p$, set hvt:=$[c, cy_0]_1$ and sends $(y_0, hvt)$ to $\mathcal{M}$.

3. $\mathcal{M}$ does as described below:
   Sample $y_\mathcal{M} \xleftarrow{\$} \mathbb{Z}_p$ and compute $[t_\mathcal{M}]_1 := (y_0, y_\mathcal{M}) \cdot [h]_1$ and $[t_\mathcal{M}]_2 := (y_0, y_\mathcal{M}) \cdot [h]_2$;
   $\pi_\mathcal{M} \leftarrow \mathcal{NIZK}_{com}.P(crs_{com}, ([h]_2, [t_\mathcal{M}]_2), [y_0, y_\mathcal{M}]_1)$;
   Send $([t_\mathcal{M}]_1, [t_\mathcal{M}]_2, \pi_\mathcal{M})$ to $\mathcal{H}$.

4. $\mathcal{H}$ checks $\mathcal{NIZK}_{com}. \vee (crs_{com}, ([h]_2, [t_\mathcal{M}]_2, \pi_\mathcal{M})=1$ and $e([t_\mathcal{M}]_1, [1]_2) = e([1]_1, [t_\mathcal{M}]_2)$; if both checks pass:
   Sample $y_\mathcal{H} \xleftarrow{\$} \mathbb{Z}_p$ and set $[t]_1 := [t_\mathcal{M} + h_2 \cdot y_\mathcal{H}]_1$, $[t]_2 := [t_\mathcal{M} + h_2 \cdot y_\mathcal{H}]_2$;
   Compute $\pi_\mathcal{H} \leftarrow \mathcal{NIZK}_{com}. ZKEval(crs_{com}, \pi_\mathcal{M}, [y_\mathcal{H}]_1)$;
   Send $y_\mathcal{H}$ to $\mathcal{M}$ and $([t]_1, [t]_2, \pi_\mathcal{H})$ to $\mathcal{I}$.

5. $\mathcal{I}$ checks $\mathcal{NIZK}_{com}. \vee (crs_{com}, ([h]_2, [t]_2), \pi_\mathcal{H})=1$ and $e([t]_1, [1]_2) = e([1]_1, [t]_2)$, and if the check passes then $\mathcal{I}$ computes $\sigma_{sp} \leftarrow Sig_{sp}(sk_{sp}, [t]_1)$ and sends $\sigma_{sp}$ to $\mathcal{M}$ (through $\mathcal{H}$).

6. $\mathcal{M}$ does as described below:
   Compute $y_1 = y_\mathcal{M} + y_\mathcal{H}$ and set $y := (y_0, y_1)^T$;
   Verify (1) $[h]_1^T \cdot y = [t]_1$ and (2) $Ver_{sp}(pk_{sp}, [t]_1, \sigma_{sp})=1$.
   If so, send the special message completed to $\mathcal{I}$ (through $\mathcal{H}$) and output sk:=$([t]_1, \sigma_{sp}, y)$ and hvt.

7. $\mathcal{H}$ outputs hvt.

8. If $\mathcal{I}$ receives the special message completed then outputs it.

Sig(gpk, sk, hvt, bsn, M, SigRL)→$(\sigma, \pi_\sigma)$: On input gpk, sk=$([t]_1, \sigma_{sp}, y)$, the base name bsn∈$\{0,1\}^\lambda$, the message M∈$\{0,1\}^m$, and a signature revocation list SigRL=$\{(bsn_i, M_i, \sigma_i)\}_{i \in [n]}$, generate a signature $\sigma$ and a proof $\pi_\sigma$ as follows:

1. Set $[c]_1 \leftarrow K(bsn)$ and set $[c]_1 := [c, c \cdot y_0]_1$;
2. Compute: $\pi \leftarrow \Pi_{sign}. P(crs_{sign}, H(bsn, M), ([c]_1, SigRL), ([t]_1, [\sigma_{sp}]_1, [y]_2))$ (the label is H(bsn, M));
3. Compute $\pi_\sigma \leftarrow \Pi_{hvt}. P(crs_{hvt}, (hvt, [c]_1), y_0)$;
4. Output $\sigma := ([c]_1, \pi)$ and $\pi_\sigma$.

Sanitize(gpk, bsn, M, $(\sigma, \pi_\sigma)$, SigRL, hvt):Parse $\sigma=([c]_1, \pi)$ and proceed as follows:

1. If $\Pi_{sign}. \vee(crs_{sign}, H(bsn, M), ([c]_1, SigRL), \pi)=0$ or $\Pi_{hvt}. \vee(crs_{hvt}, (hvt, [c]_1), \pi_\sigma)=0$ then output ⊥.
2. Re-randomize $\pi$ by computing $\pi' \leftarrow \Pi_{sign}. ZKEval(crs, H(bsn, M), ([c]_1, SigRL), \pi)$
3. Output $\sigma' := ([c], \pi')$.

Ver(gpk, bsn, M, $\sigma$, PrivRL, SigRL):Parse $\sigma=([c]_1, \pi)$ and PrivRL:=$\{f_1, \ldots, f_{n_l}\}$. Return 1 if and only if
1. $K(bsn)=[c]_1$,
2. $\Pi H_{sign}. V(crs_{sign}, H(bsn, M), ([c]_1, SigRL), \pi)$ and
3. For $\forall sk \in PrivRL$: let sk=$([t]_1, \sigma_{sp}, (y_0, y_1))$ check $(-y_0, 1) \cdot [c]_1 \neq [0]_1$.

Link(gpk, bsn, $M_1, \sigma_1$, SigRL$_1$, $M_2, \sigma_2$, SigRL$_2$)→0/1. Parse $\sigma_i = ([c_i]_1, \pi_i)$ for i=1, 2. Return 1 if and only if $[c_1]_1 = [c_2]_1$ and both signatures are valid, i. e., Ver(gpk, bsn, $M_1, \sigma_1, \emptyset$, SigRL$_1$)=1 and Ver(gpk, bsn, $M_2, \sigma_2, \emptyset$, SigRL$_2$)=1.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method comprising:
   receiving, with an intermediate processing system, an original message from a trusted execution environment, the original message comprising an original digital signature authored by the trusted execution environment;
   computing, with the intermediate processing system, a zero-knowledge proof of knowledge for the original digital signature without accessing a private key and without accessing a share of a private key; and
   modifying the original message by replacing the original digital signature with the proof of knowledge,
   wherein the method further comprises:
   receiving a request for remote attestation of a reference binary from a remote verifier;

calculating, with the trusted execution environment and in response to the remote attestation request, the original digital signature based on the reference binary, wherein the original digital signature comprises an original revocation token and the modifying of the original message comprises replacing the original revocation token with a randomized revocation token; and transmitting, to the verifier, the modified original message comprising the proof of knowledge and the randomized revocation token.

2. The method of claim 1, wherein the original message comprises the original revocation token prepared by the trusted execution environment and the method comprises: randomizing the original revocation token; modifying the original message by replacing the original revocation token with the randomized revocation token.

3. The method of claim 2, wherein the original message comprises a destination address and the method comprises transmitting the modified message to the destination address.

4. The method of claim 3, further comprising randomly selecting a parameter, wherein the original revocation token is randomized by modifying one or more fields of the original revocation token based on a randomly selected parameter.

5. The method of claim 4, wherein the trusted execution environment locally stores a trusted private key, the trusted execution environment authors the original digital signature with the trusted private key, and the randomized revocation token includes parameters sufficient to revoke the trusted private key.

6. The method of claim 1, wherein a host processing system comprises the intermediate processing system and the trusted execution environment, and the intermediate processing system performs the receiving, the computing, and the modifying.

7. The method of claim 1, comprising:
deploying the reference binary in the trusted execution environment based on the received request from the remote verifier.

8. The method of claim 7, wherein the original message comprises a digest computed by the trusted execution environment based on the reference binary.

9. The method of claim 8, wherein the digest comprises a hash of the reference binary.

10. The method of claim 1, wherein the original digital signature cannot be derived from the proof of knowledge.

11. A processing system comprising: one or more hardware processors configured to:
receive an original message from a trusted execution environment, the original message comprising an original digital signature authored by the trusted execution environment;
compute a zero-knowledge proof of knowledge for the original digital signature such that the proof of knowledge is computed without accessing a private key and without accessing a share of a private key; and
modify the original message by replacing the original digital signature with the proof of knowledge
wherein the one or more processors are further configured to:
receive a request for remote attestation of a reference binary from a remote verifier;
calculate, within the trusted execution environment and in response to the remote attestation request, the original digital signature based on the reference binary, wherein the original digital signature comprises an original revocation token and the one or more processors are configured to modify the original message by replacing the original revocation token with a randomized revocation token; and
transmit, to the verifier, the modified original message comprising the proof of knowledge and the randomized revocation token.

12. The processing system of claim 11, comprising an intermediate processing system and the trusted execution environment, wherein at least one of the intermediate processing system and the trusted execution environment comprise the one or more processors.

13. A non-transitory computer-readable medium comprising code for configuring one or more processors to: receive an original message from a trusted execution environment, the original message comprising an original digital signature authored by the trusted execution environment;
compute a zero-knowledge proof of knowledge for the original digital signature such that the proof of knowledge is computed without considering a private key and without considering a share of a private key; and
modify the original message by replacing the original digital signature with the proof of knowledge,
wherein the non-transitory computer-readable medium further comprises code for configuring the one or more processors to:
receive a request for remote attestation of a reference binary from a remote verifier;
calculate, within the trusted execution environment and in response to the remote attestation request, the original digital signature based on the reference binary, wherein the original digital signature comprises an original revocation token and the code for modifying the original message comprises code for configuring the one or more processors to replace the original revocation token with a randomized revocation token; and
transmit, to the verifier, the modified original message comprising the proof of knowledge and the randomized revocation token.

14. The processing system of claim 11, wherein the original digital signature cannot be derived from the proof of knowledge.

* * * * *